(12) United States Patent
Kim et al.

(10) Patent No.: US 10,882,214 B2
(45) Date of Patent: Jan. 5, 2021

(54) INGOT CLAMPING DEVICE AND WIRE SAWING APPARATUS FOR SLICING INGOT HAVING THE SAME

(71) Applicant: SK SILTRON CO., LTD., Gumi-si (KR)

(72) Inventors: Woo Tae Kim, Gumi-si (KR); Young Seo Bae, Gumi-si (KR)

(73) Assignee: SKSILTRON CO., LTD., Gumi-si (KR)

( * ) Notice: Subject to any disclaimer, the term of this patent is extended or adjusted under 35 U.S.C. 154(b) by 498 days.

(21) Appl. No.: 15/902,292

(22) Filed: Feb. 22, 2018

(65) Prior Publication Data

US 2019/0184603 A1   Jun. 20, 2019

(30) Foreign Application Priority Data

Dec. 14, 2017 (KR) .................. 10-2017-0171904

(51) Int. Cl.
*B23Q 9/00* (2006.01)
*B28D 5/00* (2006.01)
*B28D 5/04* (2006.01)

(52) U.S. Cl.
CPC .......... *B28D 5/0082* (2013.01); *B28D 5/007* (2013.01); *B28D 5/0076* (2013.01); *B28D 5/045* (2013.01)

(58) Field of Classification Search
CPC ....... B25B 11/00; B25B 11/005; B25B 11/02; B23Q 3/00; B23Q 3/06; B23Q 3/088; B23Q 3/154
See application file for complete search history.

(56) References Cited

U.S. PATENT DOCUMENTS

| 3,831,576 A | 8/1974 | Mech |
| 5,060,920 A * | 10/1991 | Engibarov ............ B25B 1/2452 269/282 |
| 5,893,308 A | 4/1999 | Katamachi et al. |
| 6,179,909 B1 | 1/2001 | Banzawa et al. |
| 6,557,443 B1 * | 5/2003 | Larue ...................... B23Q 1/52 82/1.11 |

(Continued)

FOREIGN PATENT DOCUMENTS

| CN | 201760976 | 3/2011 |
| CN | 202079686 U | 12/2011 |

(Continued)

OTHER PUBLICATIONS

Chinese Office Action dated Jul. 29, 2020 issued in Application No. 201810360709.0 (English translation attached).

(Continued)

*Primary Examiner* — Lee D Wilson
(74) *Attorney, Agent, or Firm* — KED & Associates, LLP

(57) ABSTRACT

According to the present invention, there is provided an ingot clamp including: a clamp body configured to have a holder mounting groove and a cavity; a fixing part configured to support and fix one side of an ingot holder inserted in the holder mounting groove; a movable fixing part disposed in the cavity and the holder mounting groove and configured to press and fix the other side of the ingot holder; a cover assembly coupled with the clamp body and configured to cover the cavity; and an air supply part coupled with the cover assembly and configured to supply air into the cavity.

19 Claims, 5 Drawing Sheets

(56) References Cited

U.S. PATENT DOCUMENTS

| | | | |
|---|---|---|---|
| 6,941,940 B1 | 9/2005 | Zavattari et al. | |
| 2019/0039195 A1* | 2/2019 | Kreft | B23Q 1/525 |

FOREIGN PATENT DOCUMENTS

| | | |
|---|---|---|
| CN | 204221987 | 3/2015 |
| DE | 195 17 107 | 11/1995 |
| DE | 600 33 574 T2 | 11/2007 |
| EP | 0 188 862 | 7/1986 |
| JP | H07-308920 | 11/1995 |
| JP | H08-064542 | 3/1996 |
| JP | H09-248822 | 9/1997 |
| JP | H11-077663 | 3/1999 |
| JP | H11-147218 | 6/1999 |
| JP | 2002-120139 | 4/2002 |
| JP | 2003-251501 | 9/2003 |
| JP | 2003-534939 | 11/2003 |
| JP | 2015-512792 | 4/2015 |
| JP | 2015-090878 | 5/2015 |
| JP | 2015-122424 | 7/2015 |
| JP | 2017-148872 | 8/2017 |
| KR | 10-0269964 | 7/2000 |
| KR | 10-2010-0092776 | 8/2010 |
| KR | 10-2013-0019111 | 2/2013 |

OTHER PUBLICATIONS

German Office Action dated Nov. 21, 2018 issued in Application No. 10 2018 203 741.8.

Japanese Office Action dated Nov. 9, 2018 issued in Application No. 2018-031594.

Korean Notice of Allowance dated Oct. 7, 2019 issued in Application No. 10-2017-0171904.

* cited by examiner

INGOT CLAMPING DEVICE AND WIRE SAWING APPARATUS FOR SLICING INGOT HAVING THE SAME

CROSS-REFERENCE TO RELATED APPLICATIONS

This application claims under 35 U.S.C. § 119 to Korean Patent Application No. 10-2017-0171904, filed Dec. 14, 2017, which is hereby incorporated by reference.

TECHNICAL FIELD

The present invention relates to a semiconductor wafer fabricating apparatus, and more particularly, to a wire sawing apparatus for slicing an ingot.

BACKGROUND

A semiconductor wafer is produced as a wafer through steps of a slicing process for thinly slicing a single crystal silicon ingot into a wafer shape, a lapping process for improving flatness while polishing to a desired thickness, an etching process for removing a damaged layer inside a wafer, a polishing process for improving mirroring and flatness on a wafer surface, a cleaning process for removing contaminants on a wafer surface, and the like.

A single crystal silicon ingot is generally grown and fabricated according to the Czochralski method. Such a method is a method of melting polysilicon in a crucible in a chamber and immersing a seed crystal, which is a single crystal, into molten silicon, and then gradually pulling up and growing the seed crystal into a silicon single crystal ingot having a desired diameter.

After the ingot growth is completed as described above, a slicing process for slicing the ingot into individual wafers is performed.

There are various methods for the slicing process such as an out diameter saw (O.D.S) method for slicing an ingot by fixing diamond particles to an outer circumferential portion of an thin plate, an inner diameter saw (I.D.S) method for slicing an ingot by fixing diamond particles to an inner circumferential portion of a doughnut-shaped thin plate, and a wire saw (W.S) method in which a slurry solution is injected onto a wire while the wire travels at a high speed, and an ingot is sliced by friction between the wire on which the slurry is adhered and the ingot.

The wire saw (W.S) method is currently a widely used method in the methods of slicing process because the ingot may be sliced into several wafers at the same time so that production yield may be improved per unit time.

A wire sawing apparatus using the wire sawing method reciprocates the wire wound at a predetermined interval on a main roller inside a chamber at a high speed, and slices into wafers by descending the ingot on the wire that is reciprocating at a high speed while injecting the slurry onto the wire through a slurry injection nozzle.

Meanwhile, the wire sawing apparatus is provided with an ingot clamp configured to clamp an ingot during the slicing process in an upper region inside the chamber.

FIG. 1 is a view illustrating one form of an ingot clamp of a wire sawing apparatus.

As shown in FIG. 1, an ingot clamp 20 includes a clamp body 21 having a holder mounting groove 21a and fixed to an upper region of a chamber, and a movable fixing part 22 and a fixing part 23 configured to fix a holder H of an ingot IG fitted in the holder mounting groove 21a.

The movable fixing part 22 has a plurality of clamp springs and unclamp cylinders. An inner space for reciprocating movement of the clamp spring and the unclamp cylinder is formed inside the movable fixing part 22. A cover 22a covering such an inner space is coupled by a manner of fastening a bolt 22b or the like in an outer side of the movable fixing part 22.

When the holder H of the ingot IG is inserted into the holder mounting groove 21a of the ingot clamp 20, the ingot clamp 20 is operated in such a manner that the clamp spring of the movable fixing part 22 presses one side surface of the holder H of the ingot IG, and the fixing part 23 is fixed more firmly to the other side surface of the holder H of the ingot IG.

On the contrary, in order to separate the holder H of the ingot IG from the ingot clamp 20, the clamp spring pressing the holder H of the ingot IG moves in the opposite direction and releases the pressing while operating the unclamp cylinder of the movable fixing part 22.

As described above, the ingot IG may be subjected to the slicing process operation while moving vertically toward the wire in a state in which the holder H of the ingot IG is clamped to the ingot clamp 20. In order to obtain the wafers of uniform thickness during the slicing process, the holder H of the ingot IG should be stably and balancedly supported on the ingot clamp 20.

However, as described above, internal contamination may occur in the clamp 20 as impurities such as slurry or silicon particles of the sliced ingot used during the slicing process penetrate into the inner space of the movable fixing part 22 through a gap of the cover 22a due to pressure difference caused by a reciprocating motion of the movable fixing part 22. Such internal contamination of the ingot clamp 20 may cause decompression or the like so that a fixing force of the ingot IG may be weakened with respect to the holder H, or may cause a clamp imbalance so that quality of the sliced wafer may be deteriorated.

In addition, the cover 22a covering the movable fixing part 22 is subjected to a finishing treatment with silicone or the like to increase a sealing force in the ingot clamp 20. When internal contamination is generated by decompression or the like, a degree of the internal contamination may not be checked easily with naked eyes.

SUMMARY

The present invention is directed to providing an ingot clamp capable of preventing wafer quality deterioration by supporting an ingot in a balanced and stable manner whereby the ingot clamp is prevented from being contaminated due to impurities such as particles of an ingot or metal particles of a wire in a chamber generated during a slicing process and keeping a fixing force of the ingot uniform, and a wire sawing apparatus for slicing an ingot having the same.

According to the present invention, there is provided an ingot clamp including: a clamp body configured to have a holder mounting groove and a cavity; a fixing part configured to support and fix one side of an ingot holder inserted in the holder mounting groove; a movable fixing part disposed in the cavity and the holder mounting groove and configured to press and fix the other side of the ingot holder; a cover assembly coupled with the clamp body and configured to cover the cavity; and an air supply part coupled with the cover assembly and configured to supply air into the cavity.

The movable fixing part may include: a pressing bar coupled with the clamp body through the holder mounting groove; a plurality of clamp springs mounted to fix with the pressing bar through the cavity and disposed along a longitudinal direction of the pressing bar; a plurality of unclamp cylinders disposed adjacent to the plurality of clamp springs through the cavity; and a support bar coupled with the plurality of clamp springs and disposed outside the cavity.

The cavity may be disposed along a side surface of the clamp body in a long hole shape.

The cover assembly may include: a gasket in which a long hole for exposing the support bar is formed and which is coupled with the clamp body; a fixing cover in which a long hole for exposing a partial region of the support bar is formed and which is configured to cover the cavity; and an air supply cover configured to supply air into the cavity through the long holes and cover the fixing cover.

The cover assembly may further include an O-ring fitted outside the long hole of the fixing cover.

The clamp body may further include a plurality of bolt holes formed along an outer circumferential surface of the cavity.

The gasket and the fixing cover may further include a plurality of fastening holes corresponding to the plurality of bolt holes to be bolted therewith, respectively.

The fixing cover and the air supply cover may further include a plurality of coupling holes into which bolts are inserted, respectively, so that the air supply cover is detachably coupled with the fixing cover.

The coupling holes may be disposed outside, and the fastening holes may be disposed inside.

The air supply cover may further include an air inlet configured to introduce air supplied from the air supply part and supply into the cavity.

The air inlet may include: an air inlet hole coupled with the air supply part; an air flow path configured to communicate with the air inlet hole and disposed long along a direction of the long hole of the fixing cover; and a plurality of injection holes formed in the air flow path and configured to allow air flowing along the air flow path to pass through the long holes and be injected into the cavity.

The support bar may include a plurality of through holes through which the plurality of clamp springs are mounted, and the air flow path may be formed at a position corresponding to the through hole of the support bar.

The air supply part may include an air pump; and an air supply pipe configured to have one side coupled with the air pump and the other side coupled with the air inlet hole.

The air supply pipe may have a spring shape at least in some sections.

Meanwhile, according to the present invention, there is provided an ingot clamp including: a clamp body configured to have a holder mounting groove formed inside, and a cavity disposed in a long hole shape along a side surface thereof; a fixing part configured to support and fix one side of an ingot holder inserted in the holder mounting groove; a movable fixing part disposed in the cavity and the holder mounting groove and configured to press and fix the other side of the ingot holder; a fixing cover which is coupled with the clamp body and in which a long hole for partially exposing the cavity is formed; an air supply cover configured to supply air into the cavity through the long hole and cover the fixing cover; and an air supply part coupled with the air supply cover and configured to supply air into the cavity.

The ingot clamp may further include a gasket which is coupled between the fixing cover and the clamp body, and in which a long hole is formed.

The ingot clamp may further include an O-ring fitted outside of the long hole of the fixing cover.

The air supply cover may include: an air inlet hole coupled with the air supply part; an air flow path configured to communicate with the air inlet hole and disposed long along a direction of the long hole of the fixing cover; and a plurality of injection holes formed in the air flow path and configured to allow air flowing along the air flow path to pass through the long holes and be injected into the cavity.

The air supply part may include: an air pump; and an air supply pipe configured to have one side coupled with the air pump and the other side coupled with the air inlet hole.

Meanwhile, according to another aspect of the present invention, there is provided a wire sawing apparatus, including: a chamber in which an ingot slicing operation is performed; an ingot clamp of any one of the above-mentioned ingot clamps configured to support an ingot inside the chamber; a slurry injection nozzle configured to inject slurry under the ingot clamp; and a main roller disposed under the slurry injection nozzle and wound with a plurality of wires for slicing the ingot.

DETAILED DESCRIPTION OF THE EMBODIMENTS

Figure 1:
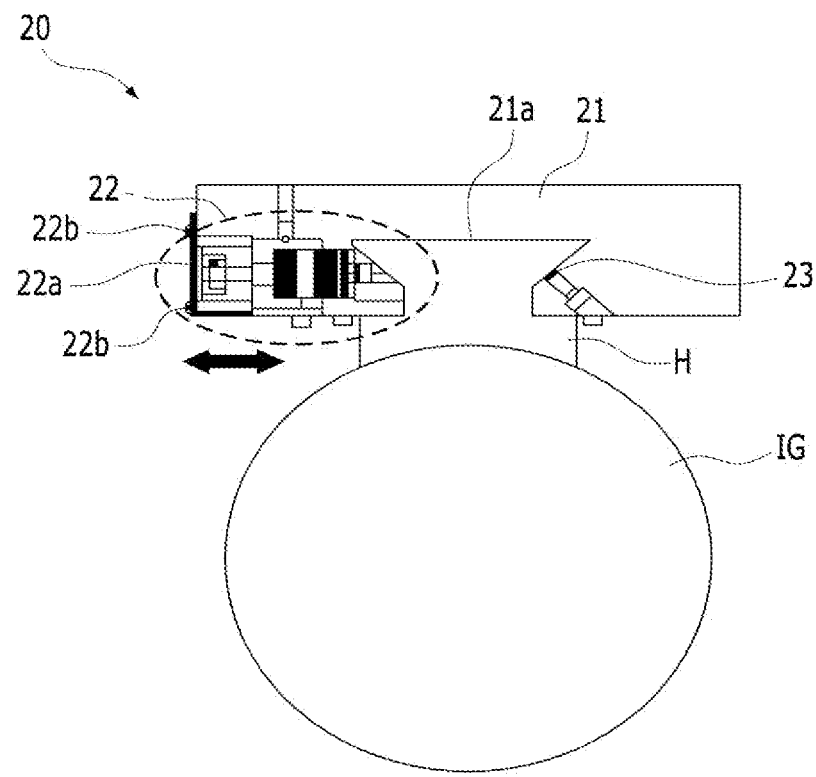
FIG. 1 is a view illustrating one form of an ingot clamp of a wire sawing apparatus.

Hereinafter, embodiments will be shown more apparent through the description of the appended drawings and embodiments. In the description of the embodiment, when it is described that each layer (film), region, pattern, or structure is formed "above/on" or "below/under" a substrate, each layer (film), region, pad or pattern, the description includes being formed both "directly" or "indirectly (by interposing another layer)" "above/on" and "below/under". Also, a standard of above/on or below/under of each layer will be described with respect to the drawings.

Areas in the drawings may be exaggerated, omitted, or schematically described for a convenient and precise description. In addition, the size of each component does not fully match the actual size thereof. Further, like reference numbers represent like elements through description of the drawings. Hereinafter, an embodiment will be described with reference to the accompanying drawings.

Figure 2:
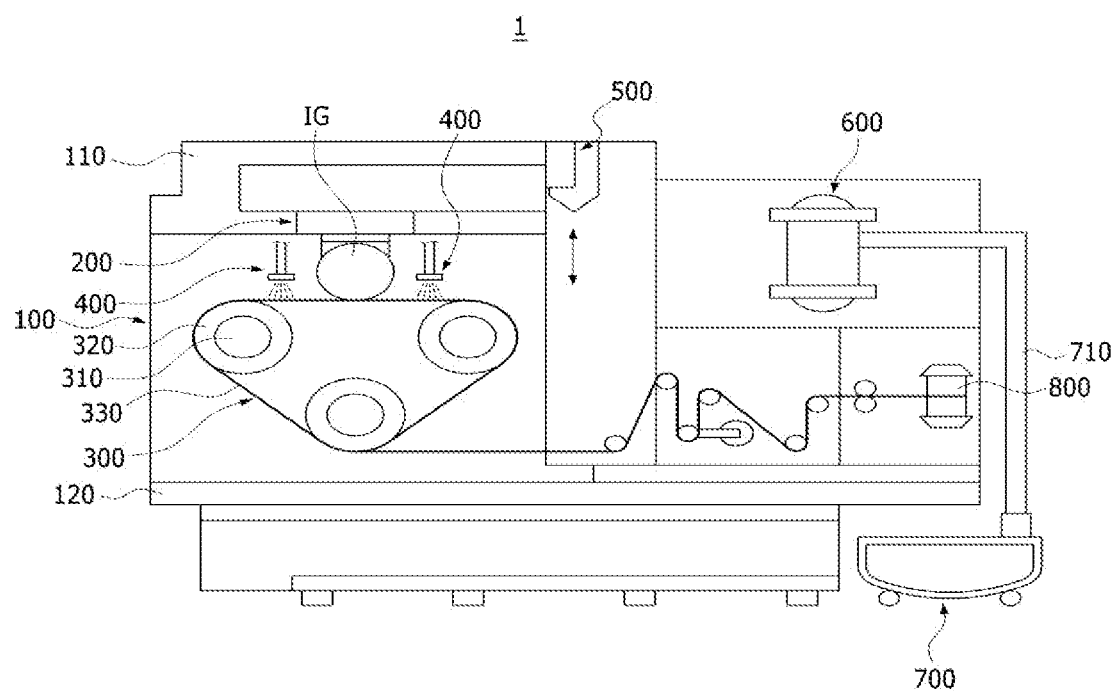
FIG. 2 is a configuration diagram of a wire sawing apparatus according to one embodiment.

FIG. 2 is a configuration diagram of a wire sawing apparatus according to one embodiment.

As shown in FIG. 2, a wire sawing apparatus 1 of one form may include: a chamber 100, an ingot clamp 200, a sawing unit 300, a slurry suppling nozzle 400, an ingot feed unit 500, a heat exchanger 600, a slurry tank 700, and the like.

The chamber 100 forms a space in which slicing, that is, a slicing operation is performed on an ingot IG. For example, the chamber 100 may be a room having an inner space of a rectangular parallelepiped shape. A door (not shown) is mounted in the chamber 100 so that the chamber 100 may be opened when the ingot IG is introduced or a sliced wafer is taken out, and the chamber 100 may be closed during the slicing operation. The chamber 100 may include an upper chamber 110 on which the ingot clamp 200 and the like are mounted, and a lower chamber 120 forming a bottom surface.

The ingot clamp 200 may support the ingot IG inside the chamber 100. The ingot clamp 200 may clamp an upper portion of the single crystal growth ingot IG and support the ingot IG while a lower region is sliced. Since the ingot IG is mounted on the ingot clamp 200, the ingot clamp 200 may be referred to as a mounting block. A configuration of the ingot clamp 200 will be described later in detail.

The sawing unit 300 may slice the ingot IG into a plurality of thin plate-like wafers, and include various configurations using a wire sawing method. For example, the sawing unit 300 may include a spindle 310, a main roller 320, and a wire 330.

The spindle 310 may be coupled with a shaft of the main roller 320 and rotate the main roller 320 while rotating around the shaft. For example, the spindle 310 may be rotated at a high speed by a driving unit such as a motor (not shown).

The main roller 320 may be formed in at least one, for example, three, that is, plural as shown in an embodiment. The main roller 320 may guide movement of the wire 330, which will be described later, so that the main roller 320 may be called as a wire guide roller.

The wire 330 may be wound on the main roller 320, and since the main roller 320 may rotate as the spindle 310 rotates, the wire 330 may travel at a high speed on the main roller 320 while moving from a bobbin 800 on one side to a bobbin (not shown) on the other side. In addition, the sawing unit 300 may further include pulleys configured to change a movement path of the wire 330.

The wire 330 may be wound in plural on an outer circumferential surface of the main roller 320 at a predetermined interval, and thus the number and thickness of the wafer sliced can be determined by the interval of the wound wires 330.

The slurry suppling nozzle 400 may be disposed above the main roller 320 to supply a slurry solution with the wire 330. The slurry solution injected from the slurry suppling nozzle 400 may be adsorbed onto the wire 330, and the slicing operation of the ingot IG may be performed by the wire 330 onto which the slurry solution is adsorbed. Since abrasive grains are contained in the slurry, when the ingot IG is moved toward and pressed to the wire 330, the abrasive grains adhering onto the wire 330 may slice the ingot IG.

The ingot feed unit 500 may move the ingot clamp 200 under the main roller 320 so that the ingot IG may be sliced by the wire 330, and the ingot clamp 200 may be moved to an upper region of the chamber 100 after the ingot IG is sliced into the wafer.

The heat exchanger 600 may function to cool down heat generated from the sawing unit 300, and may control a temperature of the slurry moving to the slurry suppling nozzle 400 in real time. Accordingly, the slurry whose temperature is controlled by the heat exchanger 600 may be injected onto the wire 330, and thus the temperature of the ingot IG can be maintained constant at a target temperature in real time.

The slurry tank 700 may store the slurry, and may move the slurry through a slurry transfer line 710 so as to inject the slurry through the slurry suppling nozzle 400. The slurry tank 700 may include a mixing part configured to mix the slurry solution accommodated therein, and a mixer driving part configured to transmit a rotating force to the mixing part.

Particles of the ingot IG or metal particles separated from the wire 330 may be included in the slurry solution during the slicing process, and the slurry including such impurities may penetrate into an inner wall of the chamber 100 and inside of the ingot clamp 200, and may contaminate the inner space thereof while being scattered into the chamber 100. As described above, the slurry including impurities penetrating into the ingot clamp 200 may weaken a fixing force of the ingot clamp 200, and thus the slicing process may be adversely affected.

To this end, a configuration of the ingot clamp 200 according to an embodiment capable of blocking the introducing of slurry impurities or the like which contaminate the inner space of the ingot clamp 200 and keeping the fixing force of the ingot clamp 200 in a balanced and stable manner will be described in detail.

Figure 3:
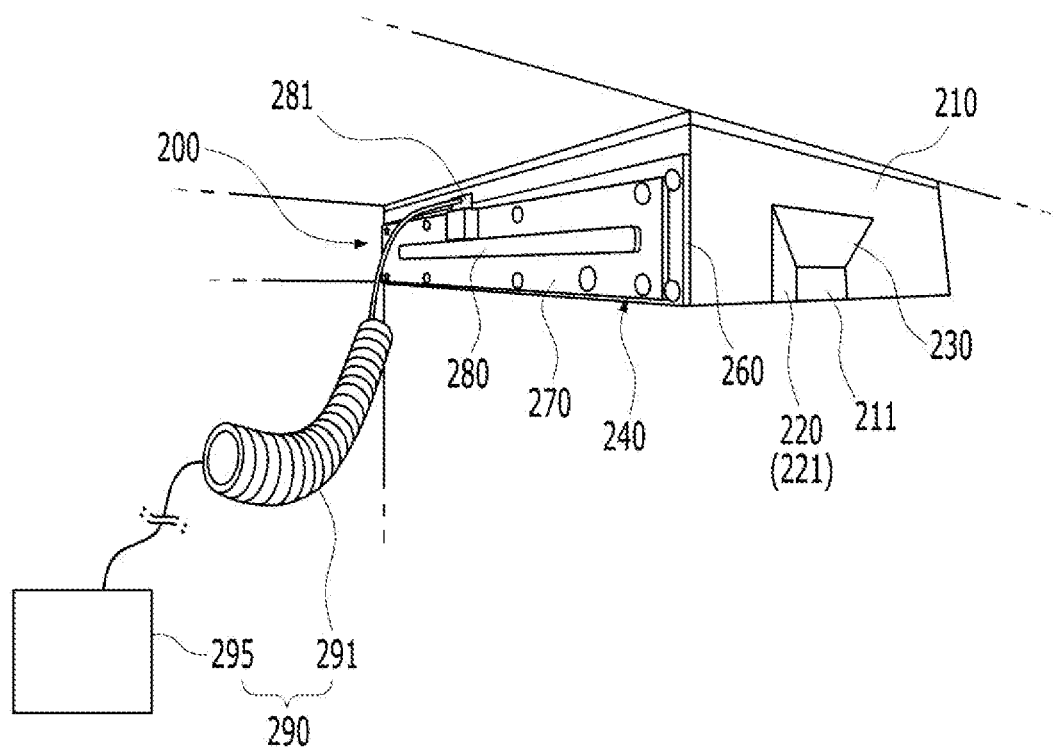
FIG. 3 is a perspective view of an ingot clamp shown in FIG. 2 according to one embodiment.
Figure 4:
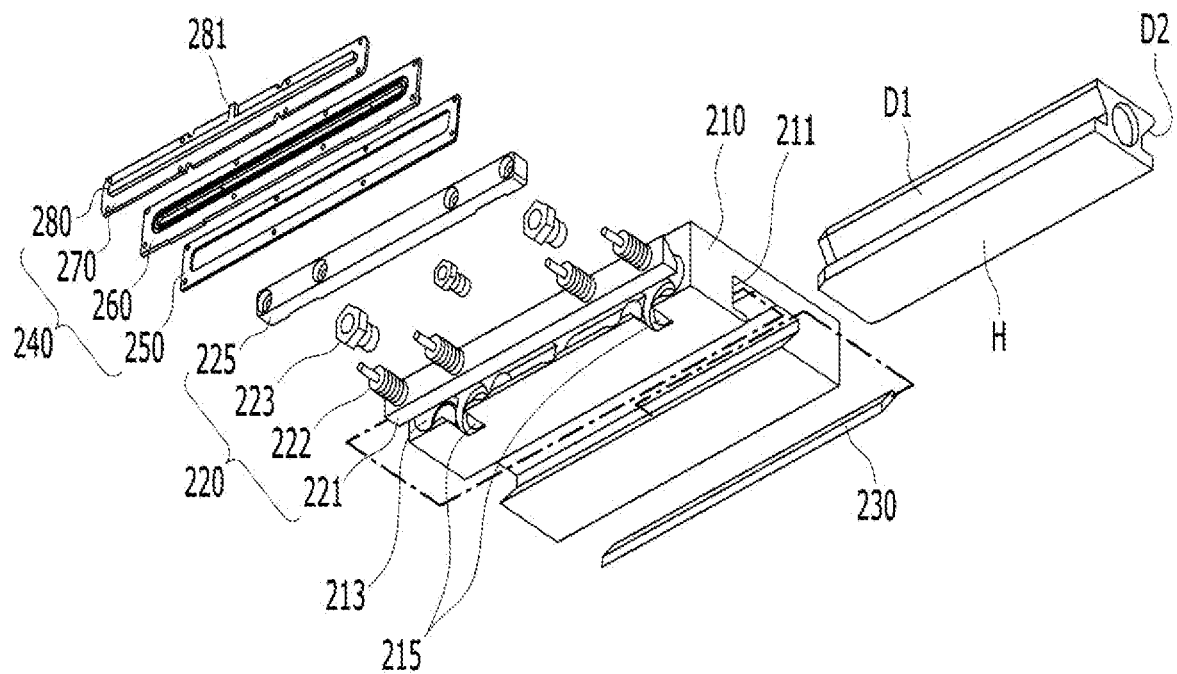
FIG. 4 is an exploded perspective view of FIG. 3.
Figure 5:
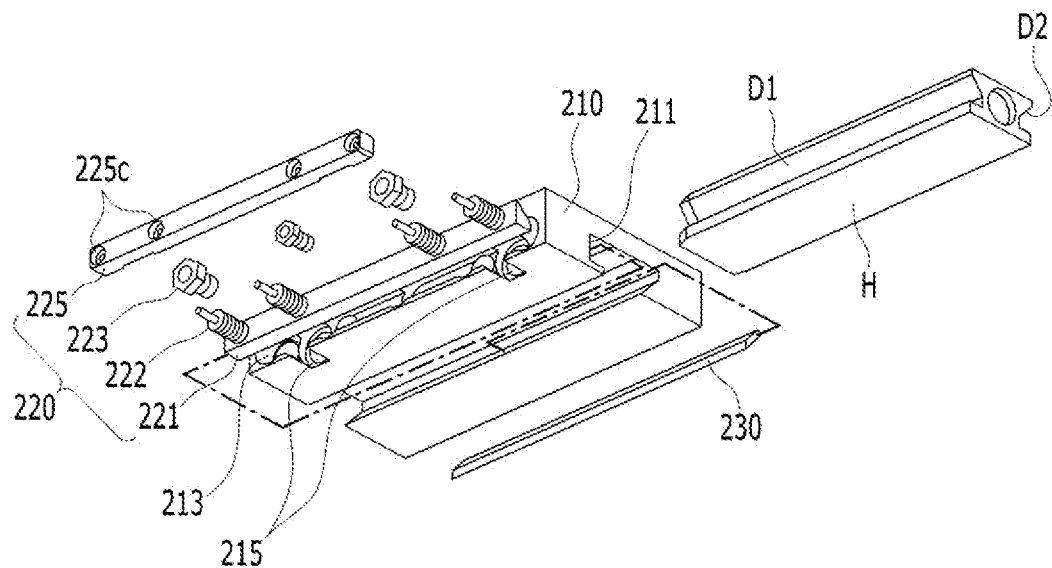
FIG. 5 is an enlarged view of the main parts of FIG. 4.
Figure 6:
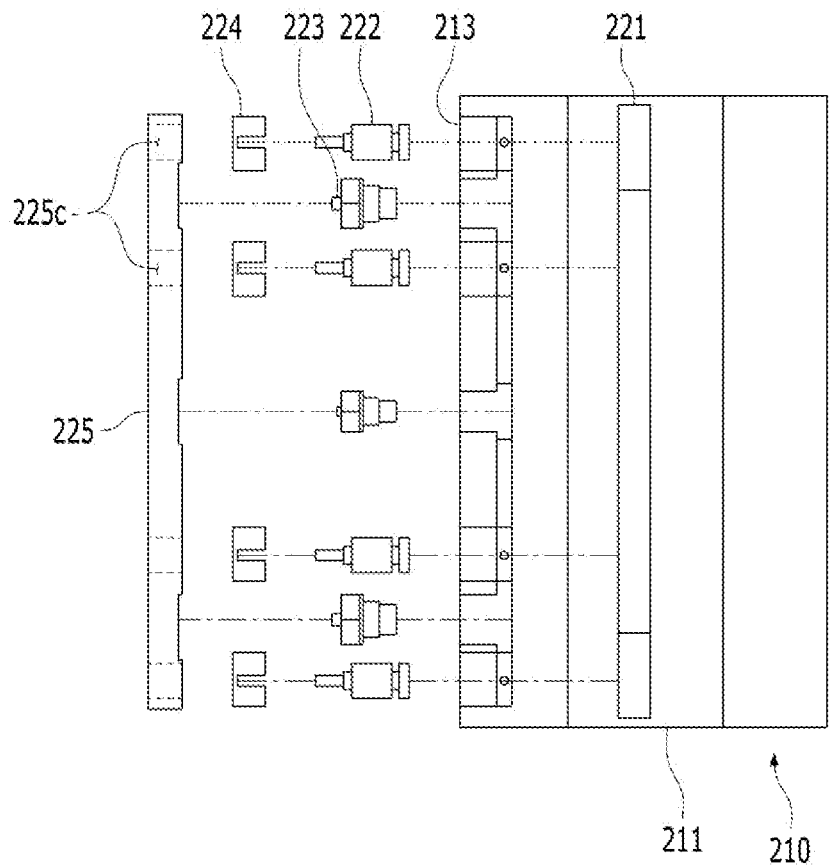
FIG. 6 is a plan view of FIG. 5.

FIG. 3 is a perspective view of an ingot clamp shown in FIG. 2 according to one embodiment, FIG. 4 is an exploded perspective view of FIG. 3, FIG. 5 is an enlarged view of the main parts of FIG. 4, and FIG. 6 is a plan view of FIG. 5.

As shown in FIGS. 3 and 4, the ingot clamp 200 may include a clamp body 210, a fixing part 230, a movable fixing part 220, a cover assembly 240, and an air supply part 290.

The clamp body 210 may have a holder mounting groove 211 and a cavity 213, and may be mounted on an upper portion of the inside of chamber 100. The clamp body 210 may have a block shape, and may have a length corresponding to that of the ingot IG. A lower hole 215 is formed in a lower portion of the clamp body 210 such that a part thereof may be manufactured in an open shape, and the lower hole 215 may be closed and blocked from the outside.

The holder mounting groove 211 may be formed at the inside of the clamp body 210, that is, may be formed through the clamp body 210 so as to extend to a lower side from the inside of a central region of the clamp body 210. For example, the holder mounting groove 211 may have a shape corresponding to the shape of an ingot holder H shown in FIG. 4. The ingot holder H may be formed with an inclined surface on a left side surface D1 and a right side surface D2 so as to facilitate clamping.

The cavity 213 may be disposed long in a long hole shape along a side surface of the clamp body 210. For example, the cavity 213 may form a space in which the movable fixing part 220, which will be described below, is mounted, and may be formed on the left side surface of the clamp body 210.

The fixing part 230 may fix one side D2 of the ingot holder H inserted into the holder mounting groove 211 while supporting the same. For example, the fixing part 230 may include a pad having a predetermined elasticity, and may be mounted on one side (the right side in the figure) of the holder mounting groove 211, and thus the ingot holder H can be supported so as not to be damaged.

The movable fixing part 220 may be disposed in the cavity 213 and the holder mounting groove 211 of the clamp body 210 so as to press and fix the other side D1 of the ingot holder H. For example, the movable fixing part 220 may include a pressing bar 221, a clamp spring 222, an unclamp cylinder 223, and a support bar 225 as shown in FIG. 5.

The pressing bar 221 may have a triangular bar shape, that is, a prism shape, and may be installed movably inside the holder mounting groove 211. To this end, the pressing bar 221 may be coupled with the clamp body 210 through the holder mounting groove 211. The pressing bar 221 may press the other side surface D1 of the ingot holder H supported by the fixing part 230, and thus the ingot holder H can be tightly fixed to the holder mounting groove 211.

The clamp springs 222 are formed in plural, and may be disposed spaced apart at a predetermined interval along a longitudinal direction of the pressing bar 221. Four clamp springs 222 are shown in this present embodiment, but the numbers may be varied. For example, the clamp spring 222 may include a plurality of coned disc springs and a support shaft passing through the inside of the coned disc springs.

The plurality of clamp springs 222 may be inserted through the cavity 213, and one side of the clamp spring 222 (for example, one side of the support shaft) may be fixed to the pressing bar 221 located in the holder mounting groove 211. That is, the clamp spring 222 may be mounted to fix with the pressing bar 221 through the cavity 213.

The clamp spring 222 may operate in such a manner that the ingot holder H inserted in the holder mounting groove 211 is pressed while the clamp spring 222 presses the pressing bar 221 by its own elasticity.

The unclamp cylinder 223 may be formed in plural, and may be disposed adjacent to the plurality of clamp springs 222 through the cavity 213. The unclamp cylinder 223 may be supplied with hydraulic oil from a hydraulic pump (not shown), and perform a linear motion inside the cavity 213. The unclamp cylinder 223 may operate the above-described clamp spring 222 to apply or release a pressure to the pressing bar 221. That is, when the unclamp cylinder 223 is operated by a hydraulic pressure, the clamp spring 222 may release the pressure applied to the pressing bar 221, and when the hydraulic pressure is removed, the clamp spring 222 may pressurize the pressing bar 221. According to the present embodiment, three unclamp cylinders 223 are shown, but the number of unclamp cylinders 223 may be varied.

The support bar 225 may be coupled with the plurality of clamp springs 222, and may be disposed outside the cavity 213. The support bar 225 may include a plurality of through holes 225c on which the plurality of clamp springs 222 are mounted. For example, four through holes 225c corresponding to four clamp springs 222 may be formed on the support bar 225. The support shaft of the clamp spring 222 inserted into the through hole 225c may be fixed to the support bar 225 by a nut (not shown).

In addition, as shown in FIG. 6, a fixing housing 224 having a through hole through which the support shaft of the clamp spring 222 is inserted may be further disposed between the clamp spring 222 and the support bar 225. The fixing housing 224 may have a number corresponding to the number of clamp springs 222. The fixing housing 224 may guide a position of the clamp spring 222 within the cavity 213, and may also function that the unclamp cylinder 223 stably supports inside the cavity 213 between the unclamp cylinders 223.

The movable fixing part 220 having the above-described configuration may operate as follows.

For example, when the ingot holder H is inserted into the holder mounting groove 211 of the clamp body 210, the fixing part 230 may be operated in such a manner that the clamp spring 222 of the movable fixing part 220 may apply a pressure to the pressing bar 221 so as to press one side surface D1 of the ingot holder H, and the fixing part 230 is fixed with the other side surface D2 of the ingot holder H while being in close contact therewith.

On the contrary, in order to separate the ingot holder H from the holder mounting groove 211, the clamp spring 222 which is pressed against the ingot holder H, and the pressing bar 221 may be moved in the opposite direction so as to release the pressure while the unclamp cylinder 223 of the movable fixing part 220 is operated by the hydraulic pressure.

Since the cavity 213 may still exist inside the movable fixing part 220 performing the above-described operation, foreign substances may be introduced from the outside, and thus there may be room for generating contamination.

To this end, the cover assembly 240 covering the cavity 213 may be coupled with the clamp body 210.

Figure 7:
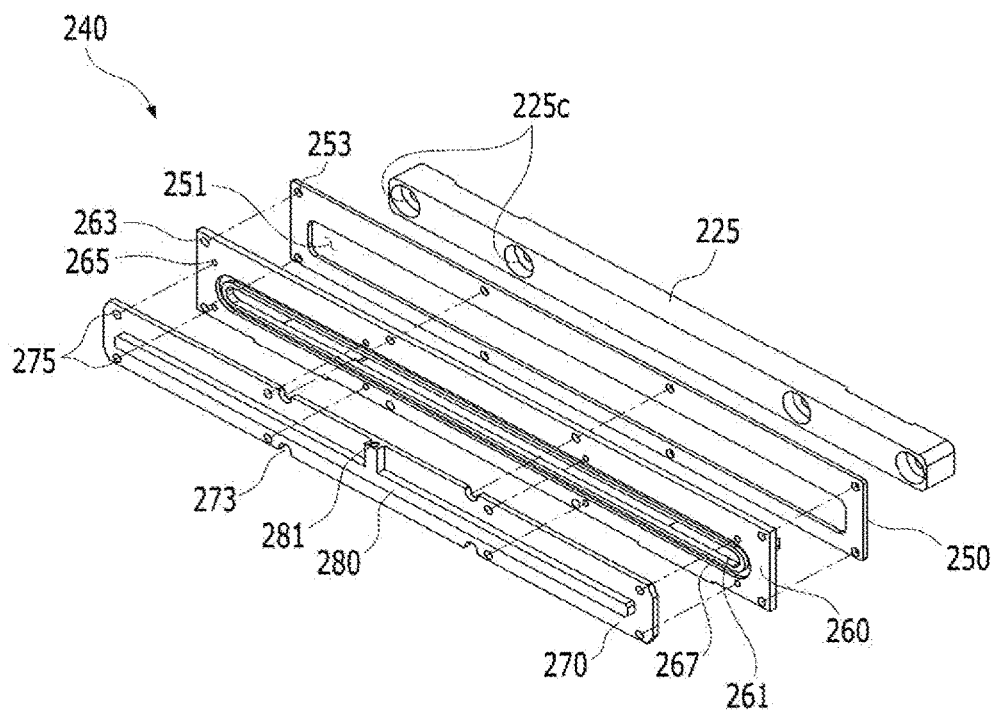
FIG. 7 is an enlarged view of a cover assembly of FIG. 4.
Figure 8:
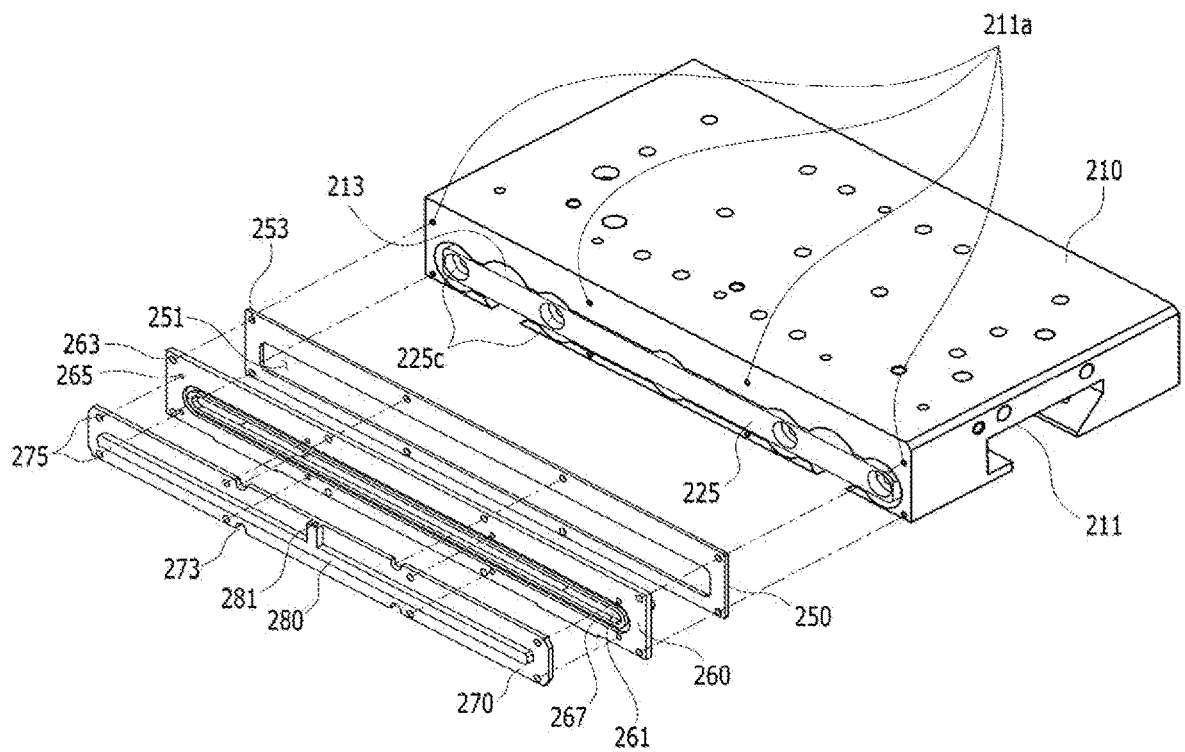
FIG. 8 illustrates a state in which the cover assembly of FIG. 7 is coupled with a clamp body.
Figure 9:
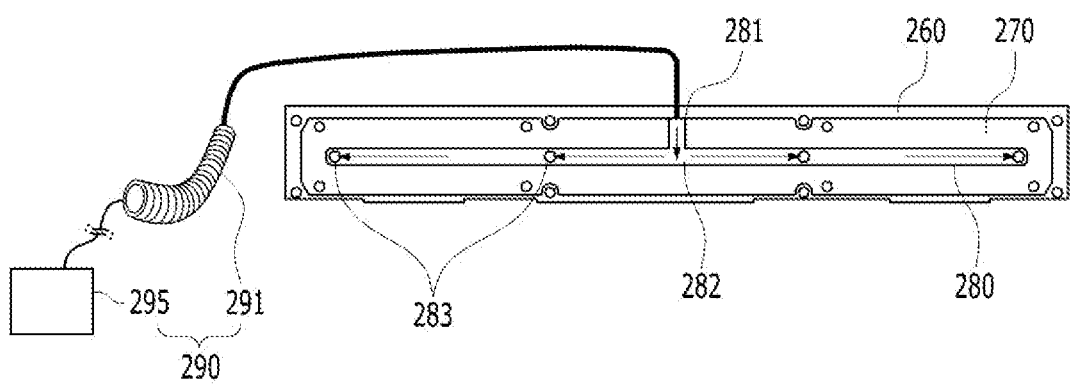
FIG. 9 is a view illustrating an air supply as a front view of FIG. 3.
Figure 10:
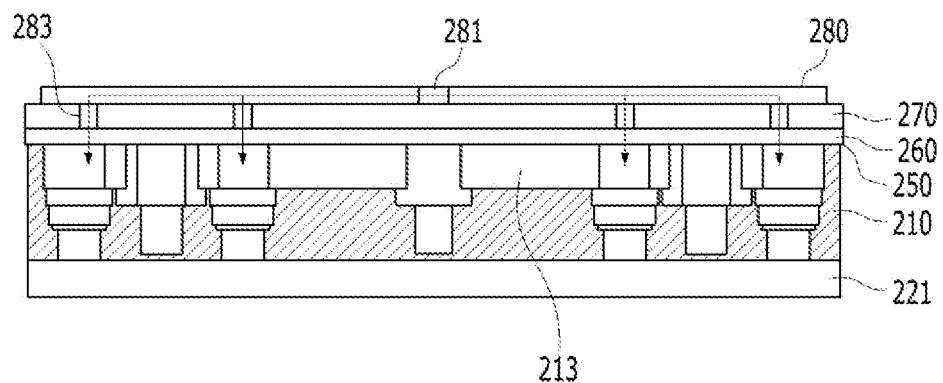
FIG. 10 is a view illustrating the air supply process of FIG. 9 in a plain view state.

FIG. 7 is an enlarged view of a cover assembly of FIG. 4, FIG. 8 illustrates a state in which the cover assembly of FIG. 7 is coupled with a clamp body, FIG. 9 is a view illustrating an air supply as a front view of FIG. 3, and FIG. 10 is a view illustrating the air supply process of FIG. 9 in a plain view state.

As shown in FIG. 7, the cover assembly 240 including a gasket 250, a fixing cover 260, and an air supply cover 270 may be mounted on the clamp body 210. To this end, as shown in FIG. 8, a plurality of bolt holes 211a may be formed in the side surface of the clamp body 210 where the cavity 213 is formed. That is, the plurality of bolt holes 211a may be arranged along an outer circumferential surface of the cavity 213. For example, eight bolt holes 211a are shown, but the number of bolt holes 211a may be varied.

The gasket 250 is formed with a long hole 251 for exposing the support bar 225 of the movable fixing part 220 and may be coupled with the clamp body 210. The gasket 250 may seal a space between the clamp body 210 and the fixing cover 260, thereby blocking a gap through which foreign substances are introduced from the outside.

The gasket 250 may be formed with a plurality of fastening holes 253 corresponding to the plurality of bolt holes 211a so as to be bolted with the plurality of bolt holes 211a of the clamp body 210.

The fixing cover 260 may be formed with a long hole 261 for exposing an inner region of the support bar 225, and may cover the cavity 213 while being coupled with the gasket 250. As shown in FIG. 8, the support bar 225 is configured to block the outside of the cavity 213, but a part of a space of the cavity 213 is still open.

Accordingly, the long hole 261 of the fixing cover 260 may expose the through holes 225c of the support bar 225 and may be in close contact with the support bar 225. A size of the long hole 261 of the fixing cover 260 may be smaller than that of the long hole 251 of the gasket 250.

Accordingly, the fixing cover 260 may include the long hole 261 for exposing a partial area of the support bar 225, but may cover the cavity 213 because the fixing cover 260 has a size that may be in close contact with the outer side of the support bar 225.

When foreign substances are introduced into the cavity 213, an operator may visually check whether or not foreign substances are introduced into the cavity 213 through the long hole 261 of the fixing cover 260 after the air supply cover 270, which will be described later, is removed from the fixing cover 260.

The fixing cover 260 may further include an O-ring 267 that is fitted outside the long hole 261. The O-ring 267 not only may provide elasticity at the time of contacting with the support bar 225 of the movable fixing part 220, but also may improve a sealing force with the cavity 213.

The fixing cover 260 may include a plurality of fastening holes 263 corresponding to the plurality of bolt holes 211*a* to be bolted (not shown) with the plurality of fastening holes 253 of the gasket 250 and the plurality of bolt holes 211*a* of the clamp body 210. The air supply cover 270 may be detachably coupled with the fixing cover 260 mounted on the clamp body 210. To this end, the fixing cover 260 may be further formed with a plurality of coupling holes 265 and 275 into which bolts are inserted. Here, the coupling holes 265 and 275 may be disposed outside, and the fastening holes 253 and 263 may be disposed inside.

The air supply cover 270 may cover the exposed long hole 261 of the fixing cover 260 to improve the sealing force with the outside, and may supply air into the cavity 213 through the long holes 251 and 261 of the gasket 250 and the fixing cover 260 described above. The air supply cover 270 may be called as an air purge cover plate.

For example, a size of the air supply cover 270 may be a smaller than that of the fixing cover 260.

The air supply cover 270 may be formed with a plurality of coupling holes 275 into which bolts (not shown) are inserted so that the air supply cover 270 may be detachably coupled with the fixing cover 260.

As shown in FIGS. 9 and 10, the air supply cover 270 may further include an air inlet 280 configured to introduce air supplied from the air supply part 290, which will be described later, and supply the air into the cavity 213.

For example, the air inlet 280 may include an air inlet hole 281, an air flow path 282, and an air injection hole 283 so as to form in a shape protruding outside the air supply cover 270.

The air inlet hole 281 may form a path coupled with the air supply part 290 through which air is introduced. For example, the air inlet hole 281 may be formed by machining a hole having a predetermined size on an upper portion of a vertical member protruding outside the air supply cover 270.

The air flow path 282 may communicate with the air inlet hole 281, and be disposed long along a direction of the long holes 251 and 261 of the fixing cover 260.

The air injection hole 283 is formed in plural in the air flow path 282, so that air flowing along the air flow path 282 may pass through the long holes 251 and 261 described above, and may be injected into the cavity 213.

For example, the air flow path 282 may be formed at a position corresponding to the through hole 225*c* of the support bar 225. Accordingly, the air injection hole 283 may inject air into the cavity 213 through the through hole 225*c* of the support bar 225.

The air supply part 290 may be coupled with the cover assembly 240 to supply air into the cavity 213, and thus the air supply part 290 can maintain the inside of the cavity 213 at a positive pressure (+ pressure). For example, the air supply part 290 may include an air pump 295 and an air supply pipe 291.

The air pump 295 may supply air with a predetermined pressure, and may be mounted on one side of the chamber 100 in the wire sawing apparatus. A manual valve configured to adjust an air pressure may be additionally provided in the air pump 295, and thus a proper air pressure can be provided.

Air supplied from the air pump 295 may be introduced through the air inlet hole 281 while one end of the air supply pipe 291 is coupled with the air pump 295 and the other end thereof is coupled with the air inlet hole 281.

Here, the air supply pipe 291 may have a spring shape at least in some sections. As well known, a spring refers to a spiral iron wire with stretching or compressing elasticity.

Since the air supply pipe 291 has a spring shape, even though the ingot is sliced into the wafer while the ingot holder H is moved vertically during the slicing process, the air supply pipe 291 may smoothly supply air without affecting the process while a length of the air supply pipe 291 is flexibly changing.

As described above, according to the ingot clamp and the wire sawing apparatus for slicing an ingot having the same of the present invention, positive pressure (+ pressure) is maintained inside the cavity by supplying air into the ingot clamp through the air supply part, and thus impurities such as particles of the ingot or metal particles of the wire generated in the chamber during the slicing process can be prevented from penetrating into the internal space of the ingot clamp. Accordingly, the ingot clamp may be prevented from being contaminated, and a fixing force of the ingot is uniformly maintained, thereby improving quality of the sliced wafer.

In addition, since the air supply part supplies proper air into the cavity and keep the cavity at a positive pressure (+ pressure), foreign substances may not be introduced into the cavity, and thus the cover assembly covering the cavity can be installed and detachably coupled with the clamp body in a relatively easy fastening manner such as bolt without a troublesome process such as silicone packing.

Further, since a state of contamination inside the cavity may be visually checked through the exposed long hole after the air supply cover is detached from the fixing cover, foreign substances can be cleaned easily and quickly even though the foreign substances are introduced into the cavity.

According to an ingot clamp and a wire sawing apparatus for slicing an ingot having the same of the present invention, a positive pressure (+ pressure) may be maintained in the ingot clamp, thereby preventing impurities such as particles of an ingot or metal particles of a wire generated in a chamber during a slicing process from penetrating into an inner space of the ingot clamp. Accordingly, it is possible to prevent the ingot clamp from being contaminated and to keep a fixing force of the ingot uniform, and thus quality of a sliced wafer can be improved.

The features, structures, effects and the like described in the embodiments are included in at least one embodiment of the present invention and are not necessarily limited to only one embodiment. Furthermore, the features, structures, effects and the like illustrated in the embodiments may be combined or modified with other embodiments by those skilled in the art to which the embodiments belong. Accordingly, it is to be understood that such combination and modification are included in the scope of the present invention.

DESCRIPTION OF REFERENCE NUMERALS

1: wire sawing apparatus
100: chamber
110: upper chamber
120: lower chamber
200: ingot clamp
210: clamp body
211: holder mounting groove
211*a*: bolt hole
213: cavity
215: lower hole
220: movable fixing part 221: pressing bar
222: clamp spring
223: unclamp cylinder
224: fixing housing
225: support bar
240: cover assembly
250: gasket
251: long hole
253: fastening hole
260: fixing cover
261: long hole
263: fastening hole
265: coupling hole
267: O-ring
270: air supply cover
273: bolt hole
275: coupling hole
280: air inlet
281: air inlet hole
282: air flow path
283: air injecting hole
290: air supply part
291: air supply pipe
295: air pump

What is claimed is:

1. An ingot clamp, comprising:
a clamp body configured to have a holder mounting groove and a cavity;
a fixing part configured to support and fix one side of a ingot holder inserted in the holder mounting groove;
a movable fixing part disposed in the cavity and the holder mounting groove and configured to press and fix the other side of the ingot holder;
a cover assembly coupled with the clamp body and configured to cover the cavity; and
an air supply part coupled with the cover assembly and configured to supply air into the cavity.

2. The ingot clamp of claim 1,
wherein the movable fixing part comprises:
a pressing bar coupled with the clamp body through the holder mounting groove;
a plurality of clamp springs mounted to fix with the pressing bar through the cavity and disposed along a longitudinal direction of the pressing bar;
a plurality of unclamp cylinders disposed adjacent to the plurality of clamp springs through the cavity; and
a support bar coupled with the plurality of clamp springs and disposed outside the cavity.

3. The ingot clamp of claim 2, wherein the cavity is disposed along a side surface of the clamp body in a long hole shape.

4. The ingot clamp of claim 3,
wherein the cover assembly comprises:
a gasket in which a long hole for exposing the support bar is formed and which is coupled with the clamp body;
a fixing cover in which a long hole for exposing a partial region of the support bar is formed and which is configured to cover the cavity; and
an air supply cover configured to supply air into the cavity through the long holes and cover the fixing cover.

5. The ingot clamp of claim 4, wherein the cover assembly further comprises an O-ring fitted outside the long hole of the fixing cover.

6. The ingot clamp of claim 4, wherein the clamp body further comprises a plurality of bolt holes formed along an outer circumferential surface of the cavity.

7. The ingot clamp of claim 5, wherein the gasket and the fixing cover further comprise a plurality of fastening holes corresponding to the plurality of bolt holes to be bolted therewith, respectively.

8. The ingot clamp of claim 7, wherein the fixing cover and the air supply cover further comprise a plurality of coupling holes into which bolts are inserted, respectively, so that the air supply cover is detachably coupled with the fixing cover.

9. The ingot clamp of claim 8, wherein the coupling holes are disposed outside, and the fastening holes are disposed inside.

10. The ingot clamp of claim 4, wherein the air supply cover further comprises an air inlet configured to introduce air supplied from the air supply part and supply the air into the cavity.

11. The ingot clamp of claim 10,
wherein the air inlet comprises:
an air inlet hole coupled with the air supply part;
an air flow path configured to communicate with the air inlet hole and disposed long along a direction of the long hole of the fixing cover; and
a plurality of injection holes formed in the air flow path and configured to allow air flowing along the air flow path to pass through the long holes and be injected into the cavity.

12. The ingot clamp of claim 11, wherein the support bar comprises a plurality of through holes through which the plurality of clamp springs are mounted, and the air flow path is formed at a position corresponding to a through hole of the support bar.

13. The ingot clamp of claim 12,
wherein the air supply part comprises:
an air pump; and
an air supply pipe configured to have one side coupled with the air pump and the other side coupled with the air inlet hole.

14. The ingot clamp of claim 13, wherein the air supply pipe has a spring shape at least in some sections.

15. An ingot clamp, comprising:
a clamp body configured to have a holder mounting groove formed inside, and a cavity disposed in a long hole shape along a side surface thereof;
a fixing part configured to support and fix one side of an ingot holder inserted in the holder mounting groove;
a movable fixing part disposed in the cavity and the holder mounting groove and configured to press and fix the other side of the ingot holder;
a fixing cover which is coupled with the clamp body and in which a long hole for partially exposing the cavity is formed;
an air supply cover configured to supply air into the cavity through the long hole and cover the fixing cover; and
an air supply part coupled with the air supply cover and configured to supply air into the cavity.

16. The ingot clamp of claim 15, further comprising a gasket which is coupled between the fixing cover and the clamp body and in which a long hole is formed.

17. The ingot clamp of claim 16, further comprising an O-ring fitted outside the long hole of the fixing cover.

18. The ingot clamp of claim 16,
wherein the air supply cover comprises:
an air inlet hole coupled with the air supply part;
an air flow path configured to communicate with the air inlet hole and disposed long along a direction of the long hole of the fixing cover; and a plurality of injection holes formed in the air flow path and configured to allow air flowing along the air flow path to pass through the long holes and be injected into the cavity.

19. The ingot clamp of claim 18, wherein the air supply part comprises:
an air pump; and
an air supply pipe configured to have one side coupled with the air pump and the other side coupled with the air inlet hole.

* * * * *